United States Patent [19]

Frieser et al.

[11] 3,904,426

[45] Sept. 9, 1975

[54] PROCESS FOR MANUFACTURING LOW TEMPERATURE SEALING GLASSES

[75] Inventors: Rudolf G. Frieser, Poughkeepsie; Jimmie L. Powell; Rao R. Tummala, both of Wappingers Falls, all of N.Y.

[73] Assignee: International Business Machines Corporation, Armonk, N.Y.

[22] Filed: Aug. 5, 1974

[21] Appl. No.: 495,014

[52] U.S. Cl. .................... 106/53; 65/134; 106/47
[51] Int. Cl.² ............................................. C03C 3/10
[58] Field of Search ............... 106/47, 53, 49, 39.6; 65/134, 33

[56] References Cited
UNITED STATES PATENTS

| | | | |
|---|---|---|---|
| 3,080,328 | 3/1963 | Billian | 106/53 |
| 3,291,586 | 12/1966 | Chapman et al. | 106/53 |
| 3,645,761 | 2/1972 | Kawamura et al. | 106/53 |

*Primary Examiner*—Helen M. McCarthy
*Attorney, Agent, or Firm*—William J. Dick

[57] ABSTRACT

A process for manufacturing a sealing glass composition consisting essentially of the following ingredients in the following proportions:

| | Percent by weight |
|---|---|
| PbO | 66.0 |
| $B_2O_3$ | 14.0 |
| $SiO_2$ | 2.0 |
| $Al_2O_3$ | 3.5 |
| ZnO | 10.5 |
| CuO | 2.5 |
| $Bi_2O_3$ | 1.5 |

The process comprises the steps of providing the batch of ingredients to the above proportions and insuring a full mixture or mixing of the same. Thereafter, in one embodiment of the process, the batch may be heated to between 750 and 850°C to form a liquid melt and then the liquid melt is further heated until the temperature is 1,100± 20°C. The temperature of the melt is held between the aforementioned limits for a period of at least 3 hours and no longer than 3½ hours, and thereafter the temperature of the melt is lowered to effectively inhibit bubbling of the liquid melt, and then the melt is removed for further processing.

4 Claims, No Drawings

PROCESS FOR MANUFACTURING LOW TEMPERATURE SEALING GLASSES

The purposes of this abstract is to enable the public and the Patent Office to determine rapidly the subject matter of the technical disclosure of the application. This abstract is neither intended to define the invention of the application nor is it intended to be limiting as to the scope thereof.

Summary of the Invention and State of the Prior Art

The present invention relates to a process for making low temperature sealing glasses, and more particularly relates to an optimized process for making low temperature sealing glasses particularly adapted for mating and sealing the panels of a gas panel, the sealing glass having the following constituents:

Sealing glass compositions which have a relatively low softening temperature (on the order of 400°–420°C) and have a thermal coefficient of expansion (from room temperature to 300°C) of about $84 \times 10^{-7}$ per °C are compatible with soda-lime-silica substrates used for the manufacture of gas panels. In the manufacturing process, a sealing glass is utilized to join two prefabricated glass panels together in a fixed spatial relationship in order to define a chamber between the panels, which chamber is filled with an inert but ionizable gas. In order to avoid cracking, it is desirable that the thermal coefficient of expansion of the seal be substantially the same as the thermal coefficient of the expansion of the glass panels and that the sealing step be achievable at a relatively low temperature.

The sealing glass to be manufactured in accordance with the novel process of the present invention is disclosed in the co-pending application of Sherk and Tummala, Ser. No. 417,347 and filed on Nov. 19, 1973 now U.S. Pat. No. 3,873,330.

One of the principal problems inherent in the manufacture of low temperature glass has been the existence of, what is known in the glass trade as "seeds and stone" in the final billet. An additional problem occurs if the temperature of the liquid melt is excessively high. Under these circumstances a faster reaction of cupric oxide ($CuO$) to cuprous oxide ($Cu_2O$) occurs. The fast reaction affects the sealing glass in that a brown colored precipitation occurs in the final seal when the glass is used in mating the spaced apart panels of a gas panel, ultimately causing leaks in the final seal at the points in the sealing glass of the brown precipitation.

Alternatively, it has been discovered that temperature alone is not the only critical parameter. For example, if the temperature is ideal, seeds and stones may still occur if the processing time at that temperature is insufficient. Additionally, if the time is excessive at the desired temperature, cuprous oxide formation or "brown" precipitation is increased.

In view of the above, it is the principal object of the present invention to provide an optimized process for manufacturing a seal glass composition which consists essentially of the constituents listed above.

Another object of the present invention is to provide an optimum process for manufacturing a sealing glass with minimal "seeds and stones" in the final product.

Yet another object of the present invention is to provide an optimum process for manufacturing a sealing glass composition in which brown precipitation of cuprous oxide is minimized or inhibited.

Yet another object of the present invention is to provide a novel process of manufacturing a sealing glass for a gas display panel in which the thermal coefficient of expansion of the sealing glass is in the range of approximately $80–84 \times 10^{-7}$ per °C in the temperature range from room temperature (approximately 22°C) to 300°C.

Other objects and a more complete understanding of the invention may be had with reference to the following specification taken in conjunction with the accompanying claims.

DESCRIPTION OF THE INVENTION

The sealing glass manufactured by the novel process of the present invention consists essentially of the following ingredients in the following proportions:

|  | Per cent by weight |
|---|---|
| $PbO$ | 66.0 |
| $B_2O_3$ | 14.0 |
| $SiO_2$ | 2.0 |
| $Al_2O_3$ | 3.5 |
| $ZnO$ | 10.5 |
| $CuO$ | 2.5 |
| $Bi_2O_3$ | 1.5 |

The glass to which the present process of manufacturing relates is described in the co-pending application of Sherk and Tummala, Ser. No. 417,347 filed on Nov. 19, 1973, the pertinent parts of which are hereby incorporated by reference. The sealing glass described in the above identified application is particularly useful in the sealing of prefabricated glass panels for the use in gas panel structures because it allows the fabrication of such gas panels at a temperature below the crazing temperature of a magnesium oxide overcoat (485°–505°C) that results when using the dielectric glasses described in examples I–IV of the co-pending application Ser. No. 374,189 filed on June 27, 1973 for "Dielectric Glass Composition." One process for manufacturing gas display panels is described in the co-pending application to Haberland et al., Ser. No. 214,348, filed on Dec. 20, 1971 now abandoned.

In accordance with the invention the glass composition constituents are mixed thoroughly for example in a blender to insure proper mixing of the batch constituents. Part of the batch of the batch constituents is then placed in a crucible composed of an inert material, such as platinum. The temperature of the batch is then raised by, for example, induction heating to 750°–850°C to form a liquid melt. The remaining batch is added little by little while mixing until the entire batch is in solution. Depending upon the quantity, of course, and the speed of mixing, the adding of the batch in small parts will insure proper mixing thereof and insure that the entire batch is brought into solution. Approximately one hour is required for the bringing of the entire batch to a solution of liquid melt.

The purpose of raising the temperature to only 750°–850°C. and maintaining the temperature while adding the remaining portion of the batch is to inhibit the formation of cuprous oxide ($Cu_2O$) and to eliminate frothing of the liquid melt. The inhibition of cuprous oxide is important inasmuch as $Cu_2O$ in quantity is undesirable as heretofore described because of precipitation at the higher temperature (hereinafter discussed) and when the glass has been cooled and used to make a seal at lower temperatures. The temperature of the entire batch is then raised to 1,100± 20°C and held within this temperature range for approximately 3–3½ hours. It should be noted that at this elevated temperature, bubbling of the liquid melt takes place.

It has been discovered that if the temperature is below approximately 1080°C lumps of undissolved particles ("seeds and stone") of probably aluminum oxide ($Al_2O_3$) form in the end product, which is undesirable for insuring a proper seal. Alternatively, it has been discovered that if the temperature is allowed to be elevated above 1,120°C, cupric oxide rapidly forms into cuprous oxide ($CuO\ Cu_2O$). It has been found that the brown precipitation of cuprous oxide ($Cu_2O$) has deleterious effects in the final seal by causing leaks in the seal.

Time is also critical. It has been found that if the melt is not kept between those aforementioned temperatures 1,080°–1,120°C for approximately 3 hours, the same result occurs as if the temperature is held below 1,080°C, that is the aluminum oxide ($Al_2O_3$) does not completely dissolve. Moreover, if the temperature is held between the critical limits for longer than 3½ hours, it has been discovered that the cupric oxide ($CuO$) reaction forming cuprous oxide ($Cu_2O$) increases rapidly.

After holding the liquid melt at 1,100± 20°C for between 2 and 3½ hours the temperature of the melt is then lowered to approximately 1,060°C or to a temperature which eliminates bubbling of the melt, and thereby reduce bubbles in the billets or rods which are ultimately formed from the melt. Thereafter, the melt is poured into molds or billets are drawn directly from the melt, whichever process is convenient for the manufacturer. The billets are then annealed at approximately 335°C for about 15 minutes and then the mold or billet is slowly cooled to room temperature.

Thereafter, as is well known, the glass rods may be drawn from the billet at approximately 435°C in lengths suitable for sealing gas panels at approximately 480°C.

It should be recognized that while it is preferable to raise the temperature of the crucible to the first plateau of 750°–850°C to form a liquid melt and thereafter add the remaining batch little by little while mixing the batch to insure proper solution, and thereby inhibit formation of cuprous oxide and to eliminate frothing of the glass batch, the temperature of the entire melt may be slowly raised while mixing through the 750°–850°C range all the way up to the critical range of 1080°C to 1,120°C. Thus the result attained would be identical.

Although the invention has been described with a certain degree of particularity, it is understood that the present disclosure has been made only by way of example and that numerous changes in the process may be made without departing from the spirit and the scope of the invention as hereinafter claimed.

What is claimed is:

1. A process for manufacturing a sealing glass composition consisting essentially of the following constituents in the following proportions:

|  | Per cent by weight |
|---|---|
| PbO | 66.0 |
| $B_2O_3$ | 14.0 |
| $SiO_2$ | 2.0 |
| $Al_2O_3$ | 3.5 |
| ZnO | 10.5 |
| CuO | 2.5 |
| $Bi_2O_3$ | 1.5 | comprising the steps of: providing a batch of constituents to the above proportion; heating the batch to form a liquid melt while insuring full mixing of the melt, until the batch has attained a temperature of between approximately 1080°C and 1120°C; maintaining the temperature of the melt for a period of 3 to 3½ hours; lowering the temperature of the melt sufficiently to inhibit bubbling of the melt; and thereafter removing the melt.

2. The process for manufacturing sealing glass in accordance with claim 1 including the steps of initially heating a small portion of the batch to between 750°C and 850°C to form a liquid melt, and adding the remainder of the batch while mixing said batch until the entire batch is in solution.

3. A process for manufacturing sealing glass in accordance with claim 1 including annealing the melt, after removal thereof, at 335°C for approximately 15 minutes.

4. A process for manufacturing sealing glass in accordance with claim 1 including the step of slowly bringing the batch ingredients to the critical temperature of 1100± 20°C while mixing the batch.

* * * * *